(12) United States Patent
Peddle et al.

(10) Patent No.: US 8,444,185 B2
(45) Date of Patent: May 21, 2013

(54) FLEXIBLE EXTRUSION RESISTANT RING SEAL ASSEMBLY

(75) Inventors: Darron G. Peddle, Millersburg, IN (US); E. Bruce Whitehead, Syracuse, IN (US)

(73) Assignee: Parker-Hanninfin Corporation, Cleveland, OH (US)

( * ) Notice: Subject to any disclaimer, the term of this patent is extended or adjusted under 35 U.S.C. 154(b) by 211 days.

(21) Appl. No.: 12/821,223

(22) Filed: Jun. 23, 2010

(65) Prior Publication Data

US 2010/0326737 A1    Dec. 30, 2010

Related U.S. Application Data

(60) Provisional application No. 61/219,944, filed on Jun. 24, 2009.

(51) Int. Cl.
*F16L 25/00* (2006.01)

(52) U.S. Cl.
USPC ........... 285/330; 285/109; 285/223; 285/913; 277/341; 277/584

(58) Field of Classification Search
USPC ............. 277/634, 638, 608, 611, 651, 590, 277/596, 619, 616, 607, 610, 341, 584; 166/344, 166/360, 382, 212, 242.1, 242.2, 242.6; 285/109, 235, 120, 330, 913, 223, 231, 113, 285/225, 229, 236, 244.1, 248.1, 248.3, 248.6; 175/320, 372; 138/135; 411/521, 520, 517; 24/286, 17 R, 23 R, 20 R, 20 CW, 20 EE, 24/910
See application file for complete search history.

(56) References Cited

U.S. PATENT DOCUMENTS

| | | | | |
|---|---|---|---|---|
| 1,858,173 A * | 5/1932 | Smittle | .......................... | 277/543 |
| 2,013,267 A * | 9/1935 | Damsel | .......................... | 277/616 |
| 2,014,313 A * | 9/1935 | Damsel | .......................... | 277/625 |
| 2,471,759 A * | 5/1949 | Lowrey | .......................... | 285/330 |
| 3,561,776 A | 2/1971 | Wilson | | |
| 3,649,032 A | 3/1972 | Nelson | | |
| 4,155,574 A * | 5/1979 | Hulsey | .......................... | 285/236 |
| 4,254,839 A | 3/1981 | Schpok et al. | | |
| 4,284,143 A | 8/1981 | Scherrer et al. | | |
| 4,383,554 A | 5/1983 | Merriman | | |
| 4,428,590 A | 1/1984 | Pippert et al. | | |
| 4,679,831 A | 7/1987 | Kielminski | | |
| 4,913,238 A | 4/1990 | Danazcko et al. | | |
| 5,140,941 A * | 8/1992 | Takakuwa | .......................... | 119/3 |
| 5,350,017 A | 9/1994 | Henderson, Jr. | | |
| 5,632,307 A * | 5/1997 | Fawley et al. | .................... | 138/99 |
| 5,732,982 A * | 3/1998 | Gebelius | .......................... | 285/49 |
| 6,120,036 A | 9/2000 | Kalsi et al. | | |
| 7,263,746 B2 * | 9/2007 | Neuhaus et al. | ................ | 24/279 |
| 7,356,888 B2 * | 4/2008 | Chao et al. | ...................... | 24/442 |
| 7,559,723 B2 | 7/2009 | Mohr | | |
| 2007/0246219 A1 | 10/2007 | Mannella et al. | | |
| 2009/0107731 A1 | 4/2009 | Fedorovich | | |

* cited by examiner

*Primary Examiner* — James Hewitt
*Assistant Examiner* — Jay R Ripley
(74) *Attorney, Agent, or Firm* — Renner, Otto, Boisselle & Sklar, LLP (57) ABSTRACT

An extrusion resistant ring that is radially expandable and contactable to accommodate the relative movement of two joined bodies relative to each other. The extrusion resistant ring in combination with an elastomeric diaphragm provides a high pressure seal for down-hole oil drilling apparatus.

21 Claims, 9 Drawing Sheets

Fig. 4 SECTION B-B

FLEXIBLE EXTRUSION RESISTANT RING SEAL ASSEMBLY

RELATED APPLICATIONS

This application claims priority to U.S. Provisional Patent Application Ser. No. 61/219,944 filed on Jun. 24, 2009, the entire disclosure of which is hereby incorporated by reference.

FIELD

The present invention relates to seals that are suitable for sealing joints between relatively movable mechanical components. More particularly, the present invention relates to seals for use in high pressure applications such as down-hole oil and gas drilling.

BACKGROUND

Sealing large gaps under high pressure is often needed in various applications. Many of these applications are dynamic, where the seal must compensate for an offset and/or flexing of the mating components. One such application is for tools used in directional/horizontal down-hole oil, gas and geothermal drilling. Steerable down-hole drills use castellated sections to transfer rotational motion while maintaining flexibility of the system. The joints between the castellated sections have extrusion gaps between the teeth of the castles and large open areas adjacent the exterior walls to allow the two sections to flex with respect to each other. To seal across the two sections, a diaphragm is typically used to keep high pressure (1500 psi) oil in and high pressure (5000 psi) mud out. The seal typically must be able to withstand temperatures up to about 200° C. Extrusion of the diaphragm between the teeth is a primary cause of sealing failure.

SUMMARY

The present invention provides among other things a novel and inventive extrusion-preventing ring for an annular seal, such as a diaphragm, that uniquely functions to prevent radial extrusion of the diaphragm or other annular seal through a gap that may be present on the side of the extrusion preventing ring that is radially opposite the seal. The extrusion-preventing ring is particularly useful in applications where high pressure joints having gaps are sealed with an annular seal such as a diaphragm. When used with conventional diaphragms in high temperature and high pressure operations, the extrusion-preventing ring provides longer life and improved functionality to the diaphragm. Such high temperature and high pressure operations include those in the oil and gas industry, and more specifically, those involved in oil, gas and geothermal drilling.

The extrusion resistant ring includes a length of dimensionally stable material. The strip is wound upon itself to form an innermost turn at least partially overlapped by an adjacent turn by an amount that enables the ring to expand and contract radially without a circumferential gap forming between opposite ends of the strip.

In one embodiment, the extrusion resistant ring is a continuous length of dimensionally stable material. The strip preferably has a width greater than its thickness, and more preferably is in the form of a flat strip. The strip may be of uniform width or may have portions thereof having different widths respectively forming an inner layer and relatively outer layer of different widths. The width of the inner layer may be greater or less than that of the outer layer for particular applications.

In another embodiment, the extrusion resistant ring includes a plurality of interlocking segments which form a strip that is wound upon itself.

The dimensionally stable material from which the extrusion resistant ring is constructed can be a metal or metal alloy. In one embodiment, the metal alloy is selected from stainless steel and brass.

The dimensionally stable material from which the extrusion resistant ring is constructed can also be a polymeric material. Examples of such polymeric materials include polyether ether ketone, polytetrafluoroethylene, and phenolic thermosetting materials. The polymeric material may include composite materials and filled and non-filled materials.

In one aspect of the invention, there is provided a seal assembly that includes an annular elastomeric diaphragm, and the extrusion resistant ring.

The elastomeric diaphragm may have a convex central portion in the axial direction. The extrusion resistant ring bridges the convex central portion of the elastomeric diaphragm.

The elastomeric diaphragm may circumscribe the extrusion resistant ring, so that the extrusion resistant ring prevents the elastomeric diaphragm from extruding radially inward. Alternatively, the extrusion resistant ring may circumscribe the elastomeric diaphragm to prevent the elastomeric diaphragm from extruding radially outward.

In one embodiment, a seal assembly includes an annular elastomeric diaphragm sandwiched between a first extrusion resistant ring and a second extrusion resistant ring.

According to a further aspect of the invention, there is provided a joint assembly that includes a first cylindrical body having a castellated end; a second cylindrical body having a castellated end; and a seal assembly that seals the adjoining castellated ends of the first cylindrical body and the second cylindrical body.

In a further aspect of the invention, there is provided a joint assembly that includes a first non-cylindrical body having a first end; a second non-cylindrical body having a second end adjoining the first end; and a seal assembly that seals the adjoining ends of the first non-cylindrical body and the second non-cylindrical body.

These and other features of the seal assembly are fully described and particularly pointed out in the claims. The following description and annexed drawings set forth in detail certain illustrative embodiments, these embodiments being indicative of but a few of the various ways in which the principles may be employed.

DESCRIPTION

Figure 1:
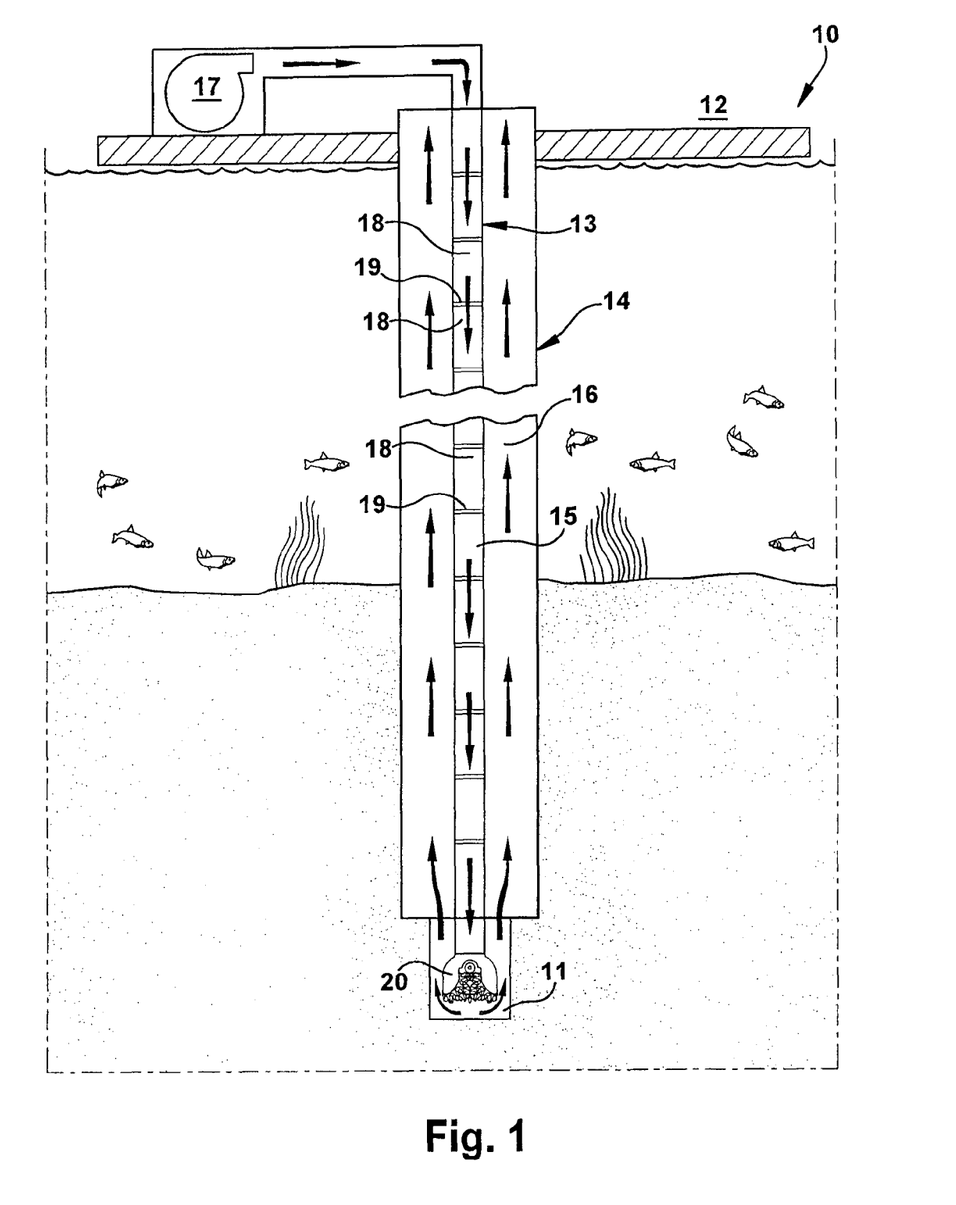
FIG. 1 is a schematic view of a drilling operation.

Referring now to the drawings, a drilling operation 10 is shown schematically in FIG. 1. The illustrated offshore operation 10 involves the drilling of an oil or gas wellbore 11 in the ocean floor with equipment controlled from a rig 12. This equipment can include, for example, a drill string 13 extending from the rig 12 into the wellbore 11 and a riser 14 surrounding the drill string 13. A drilling fluid (e.g., mud) is sent through a central passage 15 of the drill string 13 and returned through an annular passage 16 formed between the drill string 13 and the riser 14. This pumping can be accomplished, for example, by a mud pump 17 on the rig 12.

The drill string 13 typically comprises a plurality of string segments 18, connected end-to-end by joint assemblies 19, and a drill bit 20 attached to the end of the lowest segment 18. As the drill string 13 is rotated, the drill bit 20 cuts away at earth matter within the wellbore 11 to dig it deeper. The cuttings resulting from this drilling process mix with the mud pumped through the drill string 13 and return to or near the rig 12 through the riser passage 16.

As the wellbore 11 is being drilled deeper and deeper, string segments 18 are sequentially coupled on the rig 12 to the upper end of the drill string 13. The reverse is done to remove the drill string 13 from the wellbore 11 (i.e., string segments 18 are sequentially uncoupled).

Figure 2:
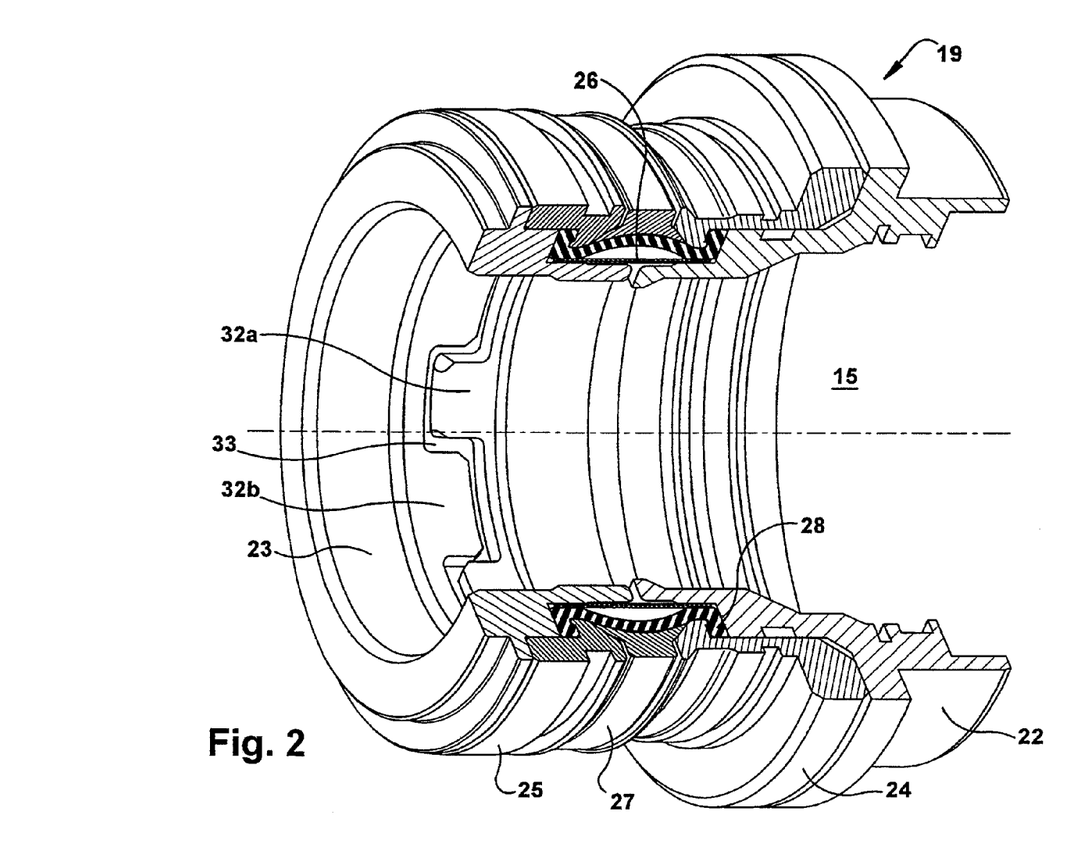
FIG. 2 is a perspective view, partially broken away, of a joint of two drill string segments including an exemplary extrusion resistant ring according to the present invention.
Figure 3:
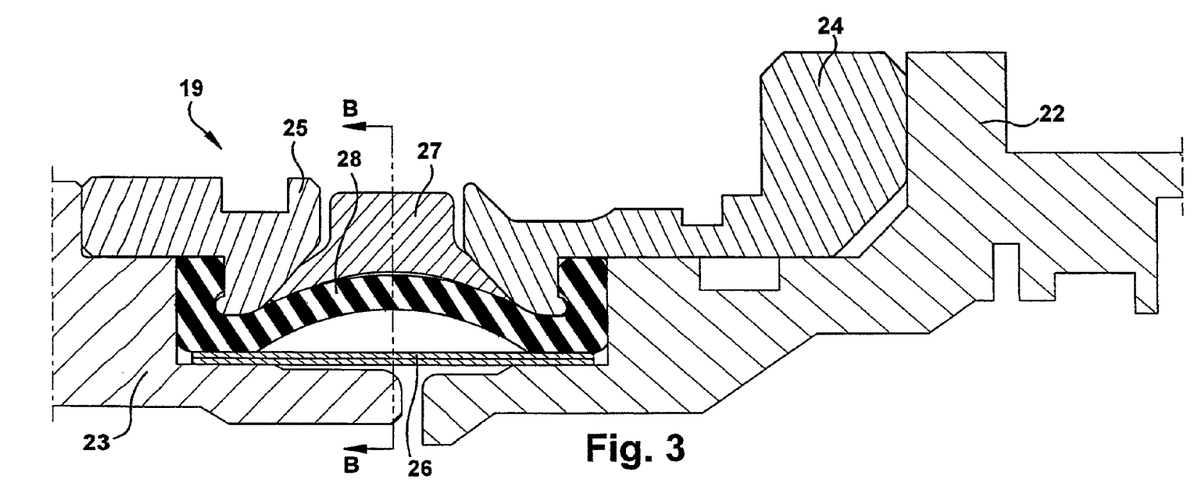
FIG. 3 is a cross-sectional view of a joint of two drill string segments incorporating the extrusion resistant ring.
Figure 4:
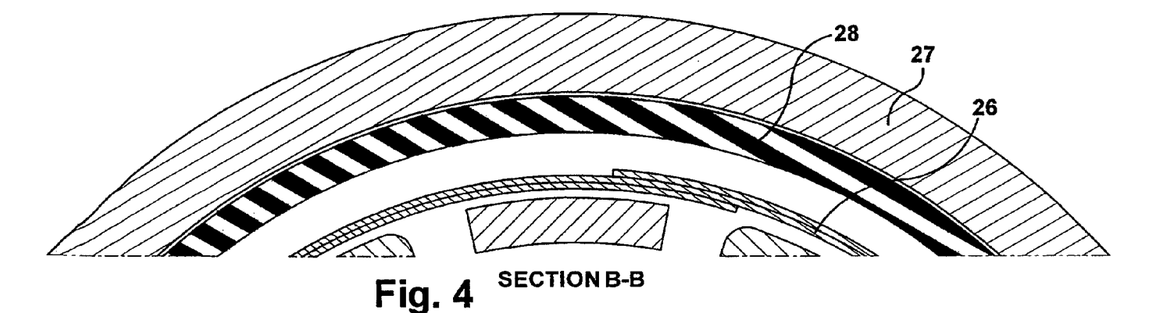
FIG. 4 is a sectional view of the joint assembly taken along lines B-B of FIG. 3.

Referring to FIGS. 2-4, the string segments 18 may have castellated end sections that are joined together by meshing the teeth of one end section with the teeth of the adjoining end section. The thusly mated end sections form a joint 19 between two castellated sections, typically at the drill head and at a second location in the drill string 13 nearer the top of the bore. The teeth of a first section 32a engage the teeth of a second section 32b so that the rotary motion can be transferred through the joint, while gaps 33 between the teeth 32a, 32b give the teeth 32a, 32b some degree of freedom to move with respect to each other as the drill string 13 is rotated and driven downward.

An annular diaphragm 28 bridges the gaps 33 between the teeth of the two sections 32a and 32b, and seals the gap between the two sections. The diaphragm or other suitable annular seal prevents escape of the lubrication fluid from the central passage 15 of the drill string 13 and prevents entry of mud (or other environmental contaminant matter) into the central passage 15.

The diaphragm 28 is secured to the bearing cap 22 and the diaphragm support 23 so as to span the interface between the bearing cap 22 and the diaphragm support 23. The diaphragm cap 24 engages one end of the diaphragm 28 to hold it against the bearing cap 22. The diaphragm clamp 25 engages the opposite end of the diaphragm 28 to hold it against the diaphragm support 23. The diaphragm support ring 27 between the diaphragm cap 24 and the diaphragm clamp 25 surrounds the diaphragm 28 and prevents it from being extruded radially outward. The extrusion resistant ring 26 is positioned between the diaphragm 28 and the teeth 32a and 32b of the string segments 18, and bridges the gap 33 between the teeth.

The diaphragm 28 may be conventionally molded, extruded and cut, or otherwise formed of an elastomeric material which may be selected for high temperature performance, flexibility, or otherwise for compatibility with the fluid being handled. The diaphragm 28 may be constructed of any elastomeric material. As used herein, the term "elastomeric" is ascribed its conventional meaning of exhibiting rubber-like properties of compliancy, resiliency or compression deflection, low compression set, flexibility, and an ability to recover after deformation, i.e., stress relaxation. Non-limiting examples of such elastomeric materials include fluorocarbon (FKM, FPM), high performance fluoroelastomers (HIFLUOR®), perfluoroelastomers (FFKM), polyacrylate (ACM), ethylene acrylate (AEM), isobutylene-isoprene (IIR), polychloroprene rubber (CR), ethylene propylene rubber (EPM, EPR, EPDM), fluorosilicone (FVMQ), acrylonitrile-butadiene (NBR), hydrogenated nitrile (HNBR, HSN), polyurethane (AU, EU), silicone (VMQ, PVMQ), and tetrafluoroethylene-propylene)(AFLAS®). Suitable materials may be filled, for example, with glass or carbon, or unfilled.

The diaphragm support ring 27 has a thick central region and tapered ends. The tapered ends are engaged by the diaphragm cap 24 on one end and by the diaphragm clamp 25 on the opposite end to secure the diaphragm 28 in place. The diaphragm support ring 27 may be constructed of a thermoplastic or thermosetting material, and is preferably harder or less flexible that the diaphragm 28 so that it performs its intended function of resisting extrusion of the diaphragm 28. Examples of materials from which the diaphragm support ring 27 may be constructed include nylon, polyester, aramid, epoxy, phenol-formaldehyde, polyether ether ketone (PEEK) and the various elastomeric materials listed above. Any of these materials may be reinforced with fabrics, fibers or filaments of glass, plastic, carbon, ceramic, metal and combinations thereof.

Figure 5:
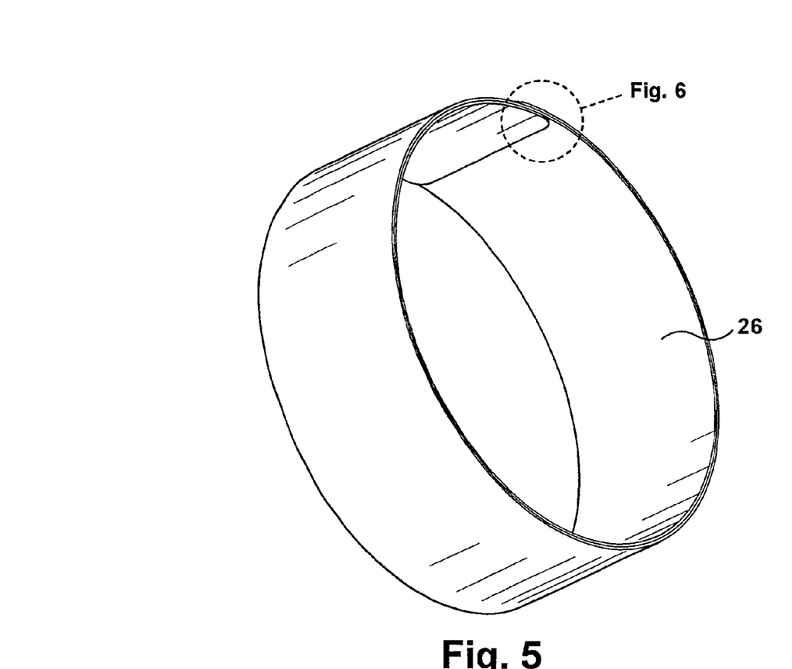
FIG. 5 is a perspective view of the extrusion resistant ring isolated from the down-hole drill sections.
Figure 6:
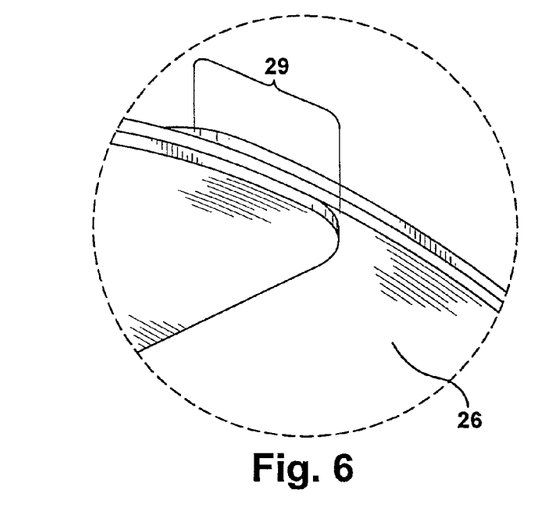
FIG. 6 is a close-up view of the overlap region of the extrusion resistant ring.

Referring to FIGS. 5 and 6, the joint further includes an extrusion resistant ring 26 that prevents the diaphragm 28 from being extruded radially inward toward the teeth 32a, 32b. The illustrated exemplary extrusion resistant ring 26 is formed from a continuous length of strip made of a dimensionally stable material. The strip is wound upon itself to form an innermost turn at least partially overlapped by an adjacent turn by an amount that enables the ring to expand and contract radially without a circumferential gap forming between opposing ends of the strip. The opposing ends of the length of resilient material overlap in an overlap region 29. As pressure is exerted on the sealing ring 26, the ring 26 can radially expand and contract so that the overlap region 29 decreases and increases, respectively. This allows the extrusion resistant ring 26 to be easily installed, and allows the sealing ring 26 to accommodate the movement of the teeth 32a and 32b relative to each other, which movement creates radial misalignment.

The extrusion resistant ring 26 may be constructed of any suitable material having sufficient dimensional stability to prevent the elastomeric diaphragm 27 from being extruded. As used herein, the term "dimensional stability" is intended to mean that the material has sufficient axial stiffness or rigidity so as not to buckle or bend when subjected to force applied to the interior or exterior surface of the ring. The thickness, width and length of the material from which the sealing ring 26 is formed, as well as the number of coils (or layers) and the diameter of the ring depends on the particular application in which the sealing ring is used. For high temperature and high pressure applications, such as for down-hole drilling applications, the suitable materials include metal and metal alloys, such as titanium, brass and stainless steel. For relatively low pressure applications, suitable materials include metals and metal alloys, as well as polymeric materials. Examples of such polymeric materials include polyether ether ketone, polytetrafluoroethylene, and phenolic thermosetting materials. The polymeric material may include composite materials and filled and non-filled materials.

In one embodiment, the extrusion resistant ring 26 is constructed of stainless steel having a thickness of about 0.05 cm, a uniform width of about 3.20 cm and a length of about 54.00 cm wound to form two full layers and a third partial layer having a circumferential length of about 8.3 cm.

Figure 7A:
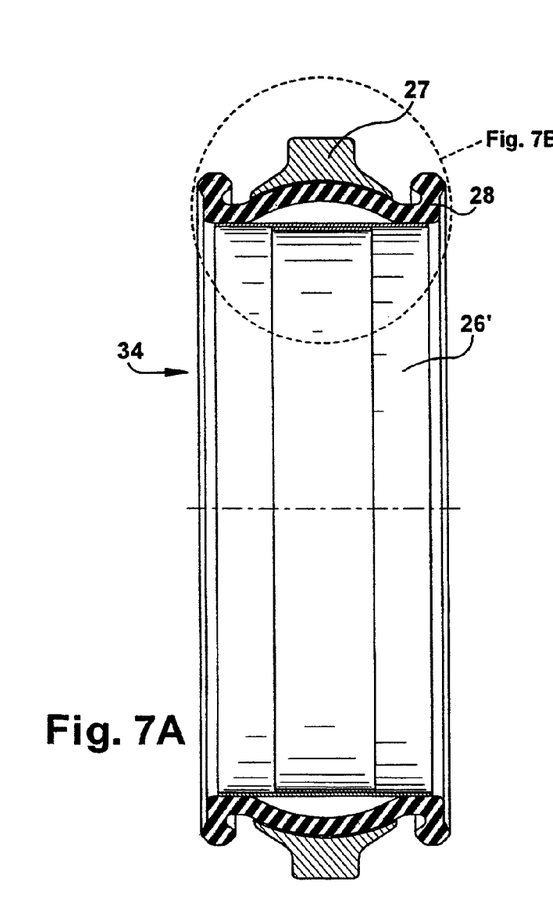
FIG. 7A is a cut away view of an embodiment of a seal assembly in pre-installation condition including an extrusion resistant ring having a narrow inner width.
Figure 7B:
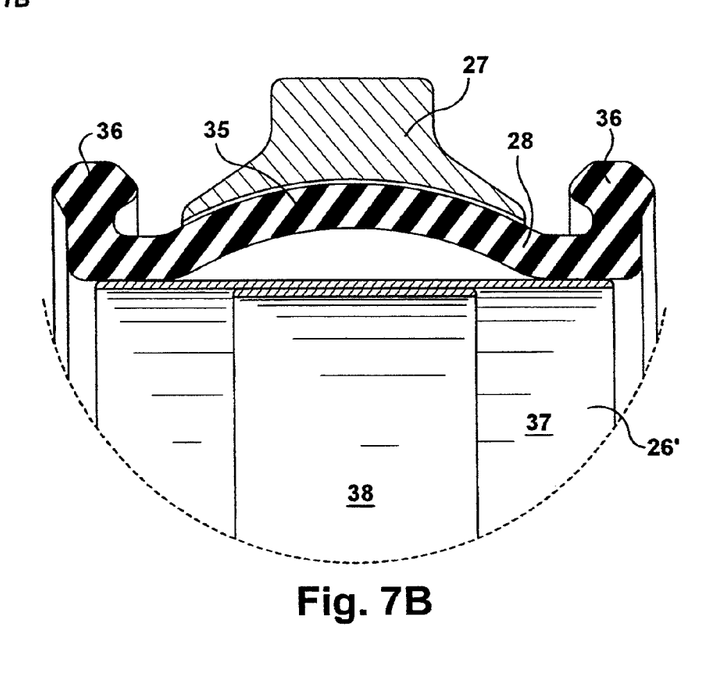
FIG. 7B is a close-up view of the cross-section of the seal assembly of FIG. 7A.

Referring to FIGS. 7A and 7B, another exemplary seal assembly 34 is shown in an uninstalled condition. The seal assembly 34 includes an extrusion resistant ring 26', a diaphragm 28 and a diaphragm support ring 27. The diaphragm 28 includes a central convex region 35 that terminates at each end at a diaphragm lip 36. The extrusion resistant ring 26' bridges the central convex region 35 of the diaphragm 28. The inner surface of the diaphragm support ring 27 is contoured to match the outer convex surface of the diaphragm 28.

Figure 8:
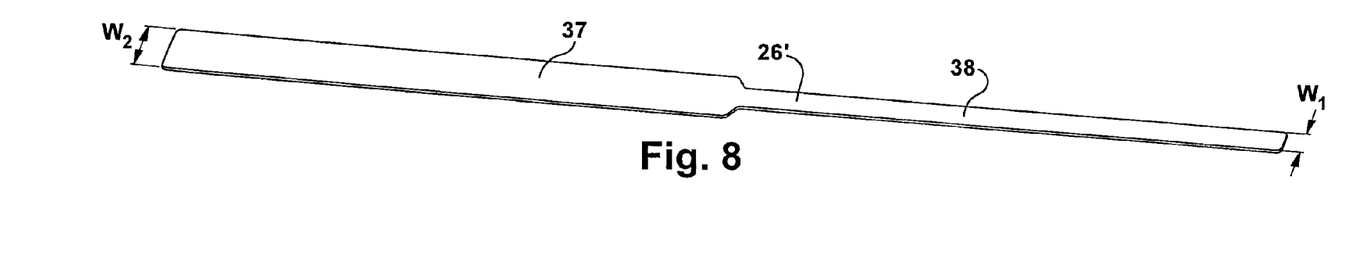
FIG. 8 is a perspective view of an embodiment of the extrusion resistant ring having a narrow inner width.

In the embodiment illustrated in FIGS. 7A and 7B, the extrusion resistant ring 26' includes an inner layer 38 having a narrow width $W_1$, and an outer layer 37 having a larger width $W_2$. As shown in FIG. 8, extrusion resistant ring 26' is constructed from a continuous length of material having a wide portion 37 of width $W_2$, and a narrow portion 38 of width $W_1$. The length of narrow portion 38 is substantially equal to the inner circumference of the extrusion resistant ring 26'. The length of the wide portion 37 is substantially equal to the length of the outer layers of the extrusion resistant ring 26' plus the overlay region 29. This embodiment provides a central reinforcement having increased resistance to extrusion.

The extrusion resistant ring 26 may be combined with the diaphragm 28 to provide extrusion resistance in the radially inward direction by positioning the extrusion resistant ring 26 inside the diaphragm 28. Alternatively or additionally, the extrusion resistant ring 26 may be combined with the diaphragm 28 to provide extrusion resistance in the radially outward direction by positioning the extrusion resistant ring on the exterior of the diaphragm 28.

Figure 9A:
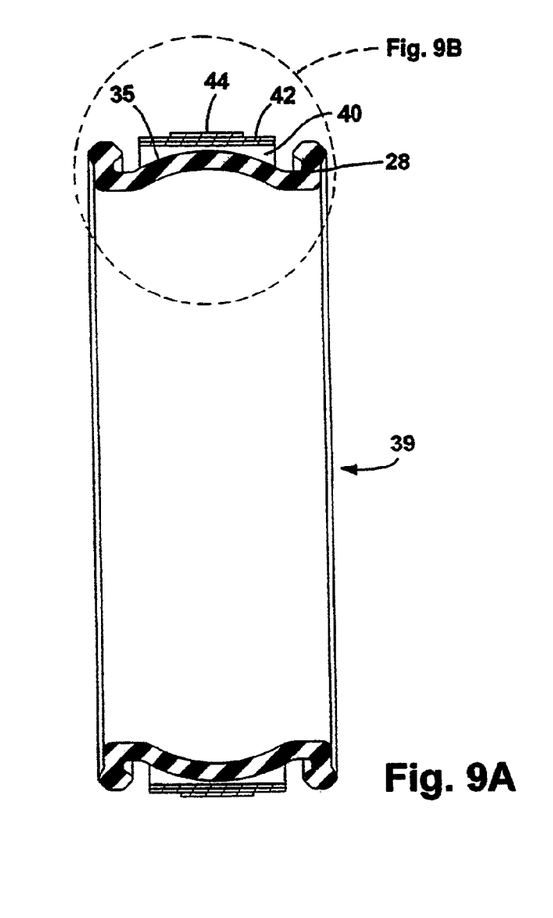
FIG. 9A is a cut away view of an embodiment of a seal assembly in pre-installation condition including an extrusion resistant ring having a narrow outer width.
Figure 9B:
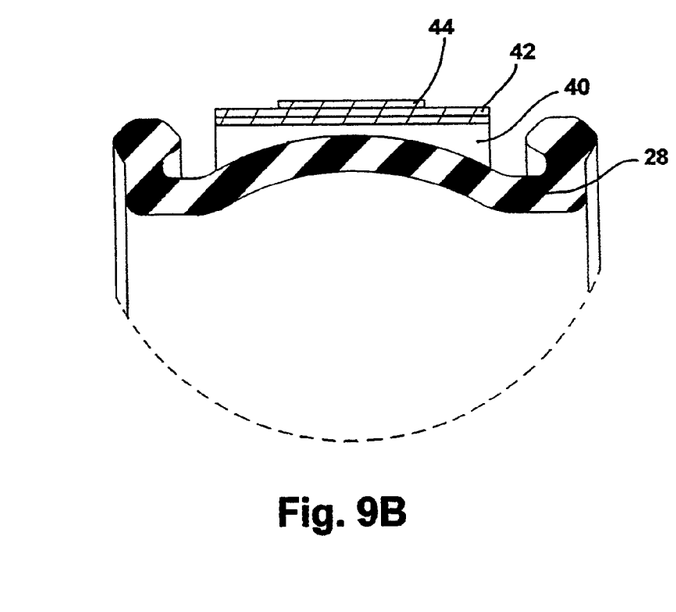
FIG. 9B is a close-up view of the cross-section of the seal assembly of FIG. 9A.

Referring to FIGS. 9A and 9B, another exemplary seal assembly 39 is shown in an uninstalled condition. The seal assembly 39 includes an extrusion resistant ring 40 and a diaphragm 28, wherein the extrusion resistant ring 40 is positioned on the exterior of the diaphragm 28 to provide extrusion resistance in the radially outward direction. The diaphragm 28 includes a central convex region 35 that terminates at each end at a diaphragm lip 36. The extrusion resistant ring 40 circumscribes the central convex region 35 of the diaphragm 28.

In the embodiment illustrated in FIGS. 9A and 9B, the extrusion resistant ring 40 includes an outer layer 44 having a narrow width $W_1$, and an inner layer 42 having a larger width $W_2$. The length of narrow portion 44 is substantially equal to the outer circumference of the extrusion resistant ring 40 plus an overlay region. The length of the wide portion 42 is substantially equal to the length of the inner layer of the extrusion resistant ring 40. This embodiment provides a central reinforcement having increased resistance to extrusion.

Figure 10A:
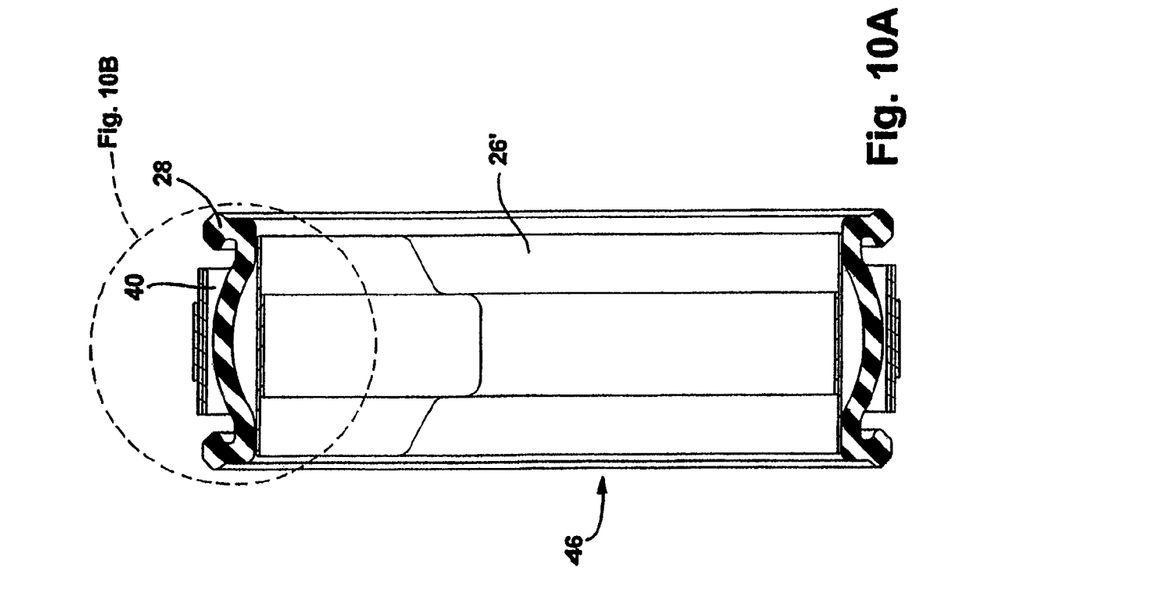
FIG. 10A is a cut away view of an embodiment of a seal assembly in pre-installation condition including an interior extrusion resistant ring having a narrow inner width, and an exterior extrusion resistant ring having a narrow outer width.
Figure 10B:
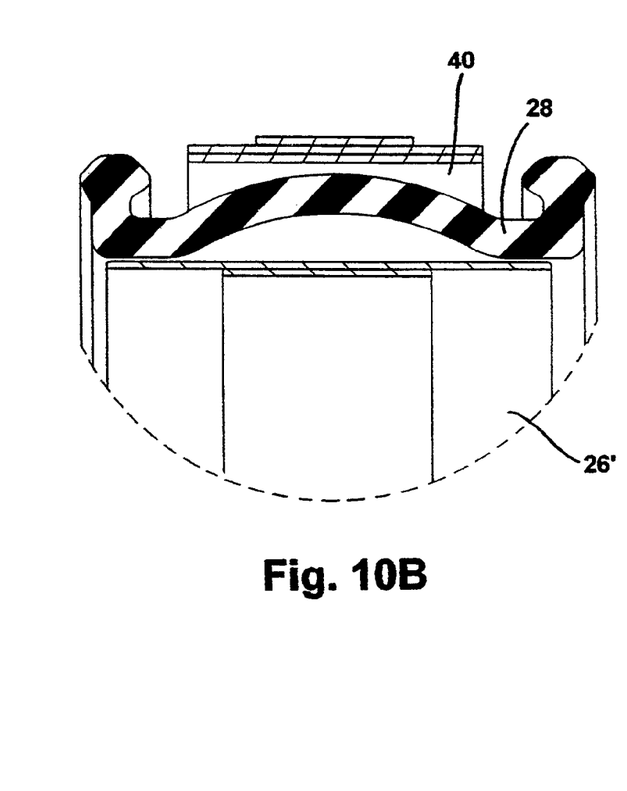
FIG. 10B is a close-up view of the cross-section of the seal assembly of FIG. 10A.

Referring to FIGS. 10A and 10B, another exemplary seal assembly 46 is shown in an uninstalled condition. The seal assembly 46 includes an outer extrusion resistant ring 40, an inner extrusion resistant ring 26' and a diaphragm 28, wherein the outer extrusion resistant ring 40 is positioned on the exterior of the diaphragm 28 to provides extrusion resistance in the radially outward direction, and the inner extrusion resistant ring 26' is positioned on the interior of the diaphragm 28 to provide extrusion resistance in the radially inward direction.

Figure 11:
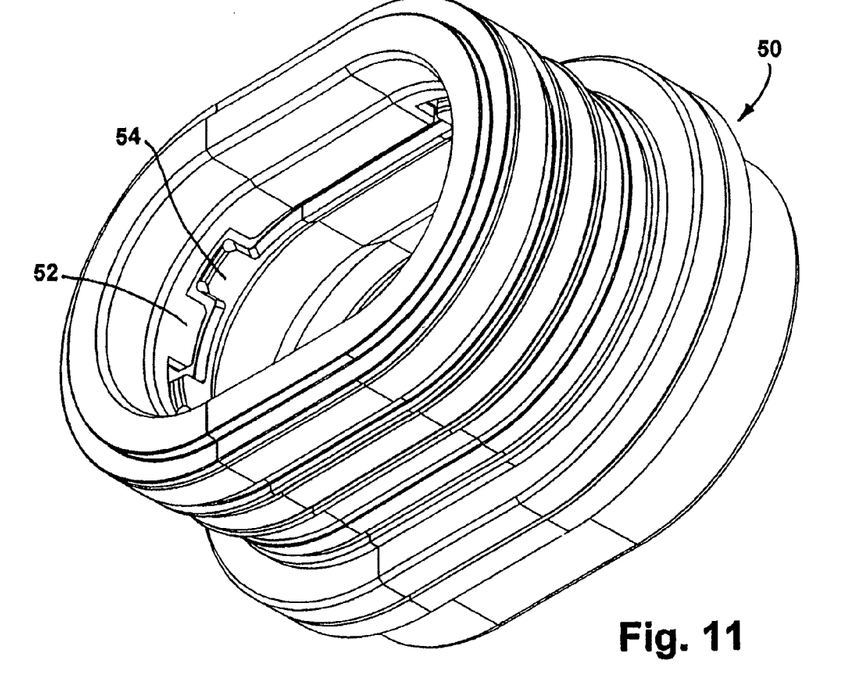
FIG. 11 is a perspective of a joint of two, non-cylindrical drill string segments including an exemplary extrusion resistant ring according to the present invention.
Figure 12:
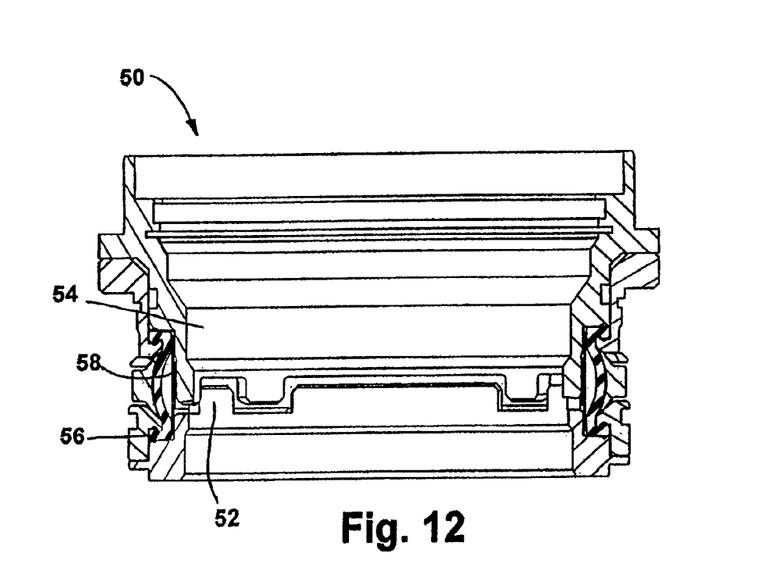
FIG. 12 is a cross-sectional view of the joint assembly of FIG. 11.

The seal assembly described herein may be used in a joint assembly that includes a first non-circular cylindrical body and a second non-circular cylindrical body. Referring to FIGS. 11 and 12, the joint assembly 50 includes a first non-circular cylindrical string segment 52, that is mated to a second non-circular cylindrical string segment 54. Diaphragm 56 seals the gaps between the teeth of the first non-circular cylindrical string segment 52 and the teeth of the second non-circular cylindrical string segment 54. Extrusion resistant ring 58 prevents diaphragm 56 from extruding in the radially inward direction.

Figure 13:
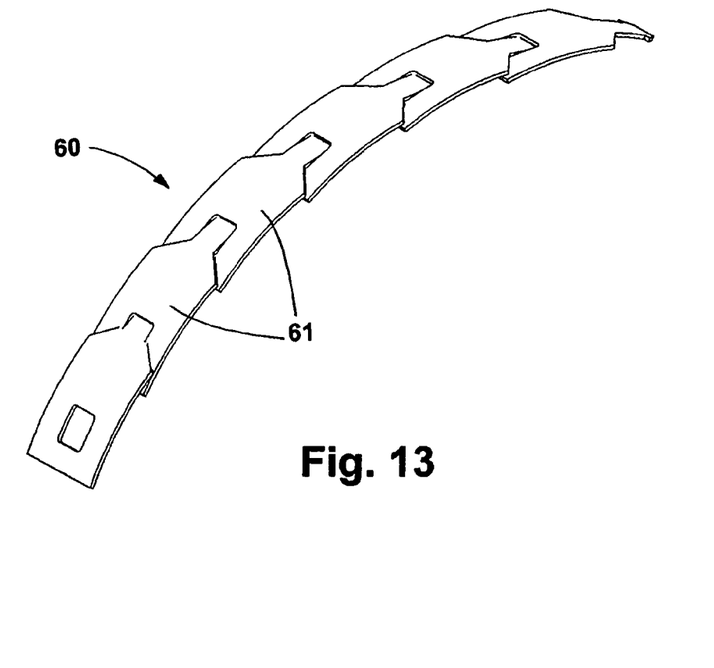
FIG. 13 is a perspective view of a portion of an exemplary extrusion resistant ring according to the present invention, the ring including a plurality of interlocking segments.
Figure 14:
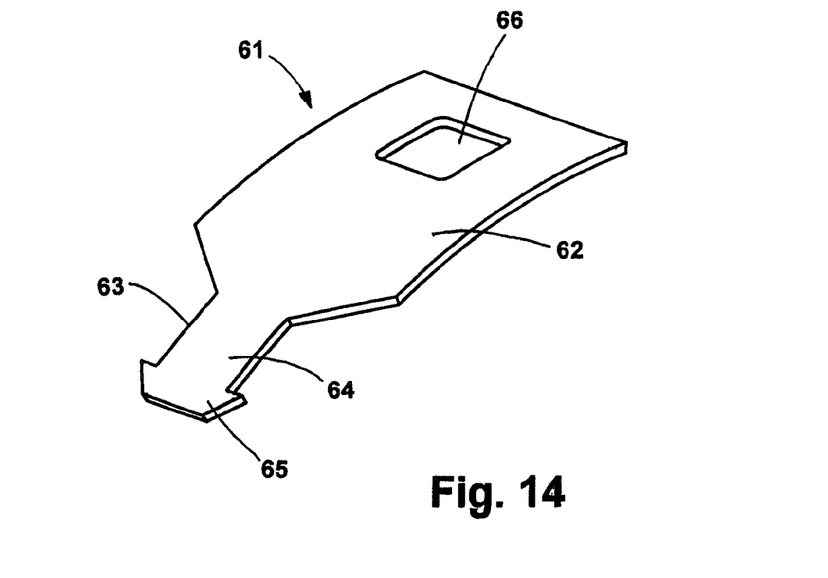
FIG. 14 is perspective view of an individual segment of the extrusion resistant ring of FIG. 13.

In one embodiment, the extrusion resistant ring may be formed of a plurality of interlocking segments. Referring to FIGS. 13 and 14, a portion of the strip 60 used to form the extrusion resistant ring is illustrated. The strip 60 includes interlocking segments 61. Each segment 61 includes an arcuate body 62 and a tab 63 joined to the body 62, the tab 63 formed by a reduced width neck 64 that terminates with a T-shaped head 65. The arcuate body 62 includes a rectangular slot 66 formed in the arcuate body for accepting the tab of an adjacent segment 61. To interlock adjacent segments 61, the tab 63 of a first segment 61 is inserted in a first direction into the slot 66 of a second segment 61 and then rotated to a second position that prevents the T-shaped head 65 of the tab 63 from being withdrawn from the slot 66. As described in detail above, the strip 60 is of sufficient length to be wound upon itself to form the extrusion resistant ring.

Although the seal assembly and/or extrusion resistant ring has been shown and described with respect to a certain embodiment or embodiments, it is obvious that equivalent alterations and modifications will occur to others skilled in the art upon the reading and understanding of this specification and the annexed drawings. In regard to the various functions performed by the above described elements (e.g., components, assemblies, systems, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A seal assembly for use sealing a gap between two opposing members of a joint assembly, the seal assembly comprising:

an annular elastomeric seal comprising a central radially outer convex surface region and a central radially inner concave surface region, the central radially outer convex surface region terminating at each axial end with a radially outward extending lip, and the annular elastomeric seal being of an essentially uniform thickness in the circumferential direction between the central radially outer convex surface region and the central radially inner concave surface region; and an extrusion preventing ring disposed on a radial side of the annular elastomeric seal for radially supporting the annular elastomeric seal against extrusion past the extrusion preventing ring to preventing radial extrusion of the annular elastomeric seal through a gap disposed on a side of the extrusion preventing ring opposite the sealing member, the extrusion preventing ring comprising a continuous length of strip having opposing ends, the strip having sufficient axial stiffness or rigidity so as not to buckle or bend when subjected to a force applied to the interior or exterior surface of the ring, which strip is wound upon itself to form an innermost turn at least partially overlapped by an adjacent turn to define an overlap region by an amount that enables the ring to expand and contract radially without a circumferential gap forming between the opposing ends of the strip, and wherein the ring is configured to radially expand by decreasing the length of the overlap region as the force is applied to the interior surface of the ring and configured to radially and contract by increasing the length of the overlap region as the force is applied to the exterior surface of the ring.

2. The seal assembly of claim 1, wherein the strip has a thickness and a width greater than its thickness, and the strip has a first portion of width $W_1$ forming an inner layer of the extrusion resistant preventing ring and another portion of width $W_2$ forming a relatively outer layer of the extrusion resistant preventing ring.

3. The seal assembly of claim 2, wherein $W_1$ is equal to $W_2$.

4. The seal assembly of claim 2, wherein $W_1$ is less than $W_2$.

5. The seal assembly of claim 2, wherein $W_1$ is greater than $W_2$.

6. The seal assembly of claim 1, wherein the extrusion resistant ring comprises a plurality of interlocking segments which form a strip that is wound upon itself.

7. The seal assembly of claim 6, wherein each interlocking segment comprises an arcuate body, a tab joined to the body that is formed by a reduced width neck that terminates with a T-shaped head, and rectangular slot formed in the arcuate body.

8. The seal assembly of claim 1, wherein the strip comprises a metal or metal alloy.

9. The seal assembly of claim 8, wherein the metal alloy is chosen from stainless steel and brass.

10. The seal assembly of claim 1, wherein the strip comprises a polymeric material.

11. The seal assembly of claim 10, wherein the polymeric material is chosen from polyether ether ketone and polytetrafluoroethylene.

12. The seal assembly of claim 1, wherein the strip comprises a phenolic material.

13. The seal assembly of claim 1, wherein the strip comprises a composite.

14. The seal assembly of claim 1, wherein the extrusion preventing ring bridges the central inner concave surface region of the annular elastomeric seal.

15. The seal assembly of claim 1, wherein the annular elastomeric seal circumscribes the extrusion preventing ring, and the ring prevents the annular elastomeric seal from extruding radially inward through the gap disposed on the interior side of the extrusion preventing ring opposite the elastomeric seal.

16. The seal assembly of claim 15, further comprising a second extrusion preventing ring circumscribing the annular elastomeric seal to prevent the annular elastomeric seal from extruding radially outward.

17. The seal assembly of claim 1, wherein the extrusion preventing ring circumscribes the annular elastomeric seal and prevents the annular elastomeric seal from extruding radially outward through the gap disposed on the exterior side of the extrusion preventing ring opposite the elastomeric seal.

18. A joint assembly comprising a first cylindrical body; a second cylindrical body; and the seal assembly of claim 1 sealing a gap between adjoining ends of the first cylindrical body and the second cylindrical body.

19. A joint assembly comprising a first cylindrical body having a castellated end; a second cylindrical body having a castellated end; and the seal assembly of claim 1 sealing the adjoining castellated ends of the first cylindrical body and the second cylindrical body.

20. A drill string comprising:
a plurality of joint assemblies in accordance with claim 19.

21. A joint assembly comprising a first non-circular cylindrical body having a first end; a second non-circular cylindrical body having a second end adjoining the first end; and the seal assembly of claim 1 sealing the adjoining ends of the first non-circular cylindrical body and the second non-circular cylindrical body.

* * * * *